United States Patent
Kovacik

(10) Patent No.: US 12,539,718 B2
(45) Date of Patent: Feb. 3, 2026

(54) PNEUMATIC VEHICLE TYRE WITH BELT BANDAGE

(71) Applicant: Continental Reifen Deutschland GmbH, Hannover (DE)

(72) Inventor: Michal Kovacik, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 94 days.

(21) Appl. No.: 18/552,277

(22) PCT Filed: Dec. 17, 2021

(86) PCT No.: PCT/DE2021/200267
§ 371 (c)(1),
(2) Date: Sep. 25, 2023

(87) PCT Pub. No.: WO2022/199733
PCT Pub. Date: Sep. 29, 2022

(65) Prior Publication Data
US 2024/0165999 A1   May 23, 2024

(30) Foreign Application Priority Data
Mar. 26, 2021   (DE) .................... 10 2021 203 082.3

(51) Int. Cl.
*B29D 30/30* (2006.01)
*B60C 9/22* (2006.01)
*B29D 30/38* (2006.01)

(52) U.S. Cl.
CPC ........ *B60C 9/2204* (2013.01); *B29D 30/3028* (2013.01); *B29D 2030/381* (2013.01);
(Continued)

(58) Field of Classification Search
CPC .......... B60C 9/2204; B60C 2009/2209; B29D 30/3028; B29D 30/3035; B29D 30/3042; B29D 30/305; B29D 30/3057
See application file for complete search history.

(56) References Cited

U.S. PATENT DOCUMENTS

| | | |
|---|---|---|
| 4,909,878 A | 3/1990 | Watanabe |
| 2006/0169394 A1 | 8/2006 | Seevers et al. |

(Continued)

FOREIGN PATENT DOCUMENTS

| | | |
|---|---|---|
| DE | 19801254 C1 | 3/1999 |
| DE | 102012103615 A1 | 10/2013 |

(Continued)

OTHER PUBLICATIONS

Machine Translation: JP-2000326419-A, Kawamura Takashi, (Year: 2025).*

(Continued)

*Primary Examiner* — Kendra Ly
(74) *Attorney, Agent, or Firm* — Richard A. Wolf; Gregory Adams

(57) ABSTRACT

A tire including a belt having a steel cord belt layer, and a bandage externally bearing radially on the belt. The bandage includes a rubber strip containing reinforcement cord. This rubber strip is wound about the belt at least from one axial belt end up to at least the other axial belt end, the ratio of the axial winding component to the circumferential winding component along the rubber strip is less than 0.01, and, over at least 70% of the axial belt width, does not vary by more than 2%. The spacing of two neighboring cords in two adjacent portions of the wound rubber strip at each circumferential position does not vary by more than 5% compared to the spacing of the cords in the rubber strip. The cords in (Continued)

the bandage are subjected to tension of at least 3 N/mm² over at least 25% of the axial belt width.

20 Claims, 4 Drawing Sheets

(52) U.S. Cl.
CPC ............... *B60C 2009/2209* (2013.01); *B60C 2009/2266* (2013.01)

(56) References Cited

U.S. PATENT DOCUMENTS

| | | |
|---|---|---|
| 2008/0087365 A1 | 4/2008 | Potin |
| 2009/0107605 A1* | 4/2009 | Yoshimi ............ B29D 30/3028 152/527 |
| 2016/0068021 A1 | 3/2016 | Kon et al. |

FOREIGN PATENT DOCUMENTS

| | | | |
|---|---|---|---|
| EP | 0288609 A1 | 11/1988 | |
| EP | 0453220 A2 | 10/1991 | |
| EP | 1318006 A2 | 6/2003 | |
| EP | 1769944 A1 | 4/2007 | |
| EP | 2987649 A1 | 2/2016 | |
| EP | 3085818 A1 | 10/2016 | |
| JP | 2000326419 A * | 11/2008 | ......... B29D 30/3028 |
| KR | 20200037992 A | 4/2020 | |
| WO | 2006032479 A1 | 3/2006 | |

OTHER PUBLICATIONS

International Search Report and Written Opinion dated Apr. 13, 2022 from corresponding International patent application No. PCT/DE2021/200267.

* cited by examiner

PNEUMATIC VEHICLE TYRE WITH BELT BANDAGE

RELATED APPLICATIONS

This application is a national phase of International Application No. PCT/DE2021/200267 filed Dec. 17, 2021, which claims priority to German Application No. 10 2021 203 082.3 filed Mar. 26, 2023, each of which is incorporated herein by reference in its entirety.

TECHNICAL FIELD

The subject matter of the patent application is a pneumatic vehicle tire with a belt consisting of at least one steel cord belt layer, which encircles the tire circumference, and a bandage which externally bears radially on the belt over the entire tire circumference. The bandage consists of a rubber strip in which at least one cord of reinforcement fibers is contained. This rubber strip is wound about the belt from at least one axial end of the belt up to at least the other axial end of the belt.

A further subject matter of this patent application is a system for producing a pneumatic vehicle tire with a belt consisting of at least one steel cord belt layer, which encircles the tire circumference, and a bandage which externally bears radially on the belt over the entire tire circumference. The system has a rotatable drum on which the belt is positioned, and a feed device which feeds the bandage, the latter consisting of a rubber strip in which at least one cord of reinforcement fibers is contained, to the rotatable drum when the bandage is being wound about the belt by the rotation of the drum.

Moreover, a subject matter of the patent application is a production method by which a pneumatic vehicle tire with a belt consisting of at least one steel cord belt layer, which encircles the tire circumference, and a bandage which externally bears radially on the belt over the entire tire circumference, is produced.

BACKGROUND

Pneumatic vehicle tires which have an encircling belt with steel cords that extends over at least nearly the entire width of the pneumatic vehicle tire have been known for 100 years. The belt has at least one steel cord belt layer. Here, the steel cords are preferably disposed so as to be mutually parallel in the matrix of the belt layer, the latter being a rubber material. The steel cords consist of steel wires, which are mostly intertwined and are mostly coated, e.g. with brass and rubber. The belt with the steel cords in the pneumatic vehicle tire, in particular as a result of its stiffness, increases the stability of the tread of the pneumatic vehicle tire, said tread when viewed in the radial direction from the tire being disposed externally on the surface of the pneumatic vehicle tire. Accordingly, the tread of the pneumatic vehicle tire has a low rolling resistance, a lower mobility of its tread blocks, and less material abrasion. This also benefits the handling characteristics of the vehicle provided with such a pneumatic vehicle tire by way of better driving stability, better steering accuracy and reduced slippage.

The belt of such a pneumatic vehicle tire consists of at least one steel cord belt layer which encircles the tire circumference.

The belt may consist of only one steel cord belt layer that encircles the tire circumference. In this case, the direction of the steel cords in the steel cord belt layer, which in this instance have a 0° winding, does not actually deviate, or deviates only slightly, from the circumferential direction of the pneumatic vehicle tire. Typically, the direction of the steel cords in the steel cord belt layer does not deviate by more than 3° from the circumferential direction, preferably by not more than 1° from the circumferential direction, and particularly preferably by not more than 0.3° from the circumferential direction.

The belt may also consist of two steel cord belt layers which encircle the tire circumference, wherein the direction of the steel cords in both belt layers deviates at a certain angle from the circumferential direction of the pneumatic vehicle tire, which is typically between 0° and 45°, preferably between 26° and 36°. However, the steel cords point toward the different sides of the pneumatic vehicle tire, so that the direction of the steel cords in both belt layers in terms of the axis direction A points in the mutually opposite direction. The steel cords in the two belt layers which lie on top of one another in the radial direction of the pneumatic vehicle tire deviate from the circumferential direction of the pneumatic vehicle tire at a certain angle, the angles typically deviating from one other by amounts of up to at most 2°, preferably at most 0.5°. As a result of the steel cords in both belt layers pointing in the opposite direction in terms of the axis direction A, the steel cords stabilize the pneumatic vehicle tire in its circumferential direction, on the one hand, but at the same time in its axis direction A or its width, respectively, because one layer of steel cords in each belt layer simultaneously increases in each case the stability of one of the sides of the pneumatic vehicle tire. Here, the axis direction A indicates the position of the straight line in space about which the pneumatic vehicle tire rotates, and thus also the straight line in relation to which the pneumatic vehicle tire is rotationally symmetrical in principle. In principle, in this instance each straight line has two directions in space along which movement is possible along the straight line. In a Cartesian coordinate system, these are usually referred to as + and − directions. The radial direction of the pneumatic vehicle tire is in this instance the radial direction in space which is known from the cylinder coordinates and is perpendicular to the axis direction A and along which the spacing to the axis direction increases. The two belt layers are in this instance disposed on top of one another in the radial direction, and have a different spacing from the axis A of the pneumatic vehicle tire and from the surface of the latter. Both belt layers are in most instances disposed in the circumferential direction of the pneumatic vehicle tire, which corresponds to the circumferential direction of the cylinder coordinates. Owing to its fundamental rotational symmetry, the structure of a pneumatic vehicle tire can generally best be described with cylinder coordinates and the spatial directions used herein.

Preferably, pneumatic vehicle tires, which have an encircling belt with steel cords, also have a bandage which externally bears radially, i.e. in the radial direction, on the belt over the entire tire circumference. Externally here refers to the direction of the radial direction in which the spacing from the axis direction A of the pneumatic vehicle tire increases, or in which the spacing from the surface of the tread of the pneumatic vehicle tire decreases, respectively.

Such a bandage, which externally bears radially on the belt over the entire tire circumference, consists of one or a plurality of rubber strips which contain at least one cord of reinforcement fibers that are wound radially outside about the belt of the pneumatic vehicle tire. This bandage is preferably used for high-speed tires. At high speeds, high forces act in particular in the outward direction on a pneumatic vehicle tire, i.e. the centrifugal forces. In order to counteract any resultant expansion of the pneumatic vehicle tire, the bandage stabilizes the tire by the cords of reinforcement fibers that are present in the rubber strips of the bandage. In order to optimize their effect, the cords are wound about the belt of the pneumatic vehicle tire in the circumferential direction. Accordingly, in the rubber strips the cords in their longitudinal direction are usually disposed at mutually equal spacings in a plane, so as to achieve a uniform reinforcing effect over the entire width of the pneumatic vehicle tire. Therefore, in the axis direction, the bandage should reach from at least one axial end of the belt of the pneumatic vehicle tire up to at least the other axial end of the belt. Advantageously, the bandage in the axis direction A extends even beyond the ends of the belt.

Polymer fibers, especially nylon or aramid fibers, or else polyester fibers, can particularly be used as reinforcement fibers in the cords of the bandage. Moreover, viscose fibers (rayon) can also be utilized. Typically, a cord consists of 100 to 300 nylon fibers or 700 to 1300 aramid fibers, preferably 140 to 280 nylon fibers or 900 to 1100 aramid fibers.

The radial expansion of a pneumatic vehicle tire at high speeds is prevented or at least reduced as a result of the bandage, in particular the reinforcement fibers contained therein. This prevents or at least reduces the growth in size of the pneumatic vehicle tire in the radial direction. This is particularly critical in the shoulder region of the pneumatic vehicle tire, where the belt of the pneumatic vehicle tire ends in terms of its width. The growth in the size of the pneumatic vehicle tire results in an uneven and, above all, reduced contact surface of the tire on the road, and in uneven tire abrasion. In the shoulder region of a pneumatic vehicle tire, large lateral forces also act when driving, so that growth in the shoulders diminishes the transmission of force.

There are now different methods of applying a bandage to a belt of a pneumatic vehicle tire. In most instances, the belt is first positioned on the outside of a rotatable drum, the belt layers of the belt being positioned in such a way that their steel cords are positioned in the circumferential direction of the drum in the same way as later in the circumferential direction of a finished pneumatic vehicle tire. In the process, the belt can be fixed to the rotatable drum with the aid of magnets in the latter, which then attract and correspondingly retain the steel cords in the belt.

The rubber strips of the bandage are then wound about the belt by positioning the rubber strips on the belt, then rotating the rotatable drum, and the rubber strips being wound about the belt as a result of the rotating movement of the drum. This requires a feed device that feeds the rubber strips to be wound to the rotatable drum. A feed device can in particular be a feeding head by which the rubber strip is moved to the rotatable drum by means of a drive. In order for the rubber strip to be wound over the entire width of the pneumatic vehicle tire, the feed device must move relative to the rotatable drum. Preferably, the feed device moves along an axis parallel to the axis direction A of the rotatable drum. In the finished pneumatic vehicle tire, this axis direction A then also corresponds to the axis direction A in relation to which the pneumatic vehicle tire is rotationally symmetrical and about which the latter rotates.

When winding the bandage about the belt, it is important that the bandage is wound uniformly about the belt to ensure that the bandage stabilizes the pneumatic vehicle tire uniformly and, for example, counteracts the growth in size over the entire tire width at high speeds. This includes that one or a plurality of the rubber strips are not wound on top of one another, i.e. there are no multiple rubber strips in the radial direction of the tire. This would allow the height of the tire to vary in terms of its width, and thus, for example, could potentially lead to a vibratory behavior and to imbalances over the tire circumference. Likewise, during winding, the rubber strips should not be deposited in such a way that there are excessive spacings between adjacent portions of the wound rubber strip.

Especially for the economic reason of fast and therefore cost-effective production, two rubber strips are often wound simultaneously with two feeding heads, also referred to as winding heads, on the belt, wherein the rubber strips often have a larger number of cords of reinforcement fibers that are disposed in parallel. Typically, a rubber strip then has four to twelve cords on a typical width of 4 to 15 mm. However, according to the method it is also possible to wind rubber strips with only one cord or two or three cords, and likewise rubber strips with more than twelve cords. The winding with two feeding heads can be carried out in such a way that the winding of a rubber strip first begins at one end of the belt, and a second rubber strip is first wound in the center of the belt. During the winding of the rubber strips, both feeding heads then move, usually parallel to one another, along one or two axes parallel to the axis direction A of the rotatable drum, until the first rubber strip reaches the center of the belt and the second rubber strip reaches the other end of the belt. In another method with two feeding heads, the winding of the rubber strips begins at both ends of the belt, and the feeding heads then converge on one or two straight lines parallel to the axis direction A of the rotatable drum, until the belt is wrapped with the two rubber strips in its entire width. In another method, the winding of the two rubber strips begins with two feeding heads in the center of the belt, and the feeding heads then move on one or two straight lines parallel to the axis direction A of the rotatable drum toward the two ends of the belt.

Because two rubber strips are wound in the methods, there is always a region in which both rubber strips are present in the axis direction A of the rotatable drum after the winding process. Since the accuracy of the winding controller is limited and both rubber strips must have a small inclination in relation to the circumferential direction of the rotatable drum during winding, there is a high risk that, in the region mentioned—where both rubber strips are present—the two rubber strips overlap one another due to the winding process, i.e. lie on top of one another in the radial direction, or have a mutual spacing at least over a small circumferential region, which spacing is more than the spacing in the winding otherwise present between adjacent portions of a rubber strip, because there is a gap between the two rubber strips.

In order to avoid these issues, only one rubber strip can be wound about the belt fixed on a rotatable drum, the rubber strip being fed to the drum by only one feed device. Such a winding process is known, for example, from KR 20200037992 A1. In a method of this type, the rubber strip in a winding direction relative to the circumferential direction of the belt fixed on the rotatable drum is wound about the belt at least from one axial end of the belt up to at least the other axial end of the belt. During winding, the rubber strip is impinged with a minor tensile force, typically from 5 N, often in the order of 10 to 20 N. Even higher tensile forces are at times during the winding exerted on the rubber strip in the peripheral region of the belt. Typically, this tensile force is exerted by the feed device. Since a rubber strip is now wound about the entire width of the belt, there is an increased risk of the rubber strip slipping off the belt during the winding process, because the process takes longer and the individually wound rubber strip is substantially longer. This risk naturally increases with the tensile force exerted on the rubber strips during winding. It is therefore important to carry out this winding process in a very controlled manner in order to guarantee the quality of this winding. This issue becomes more essential if the belt and the bandage wound about it are to be used in a tire that is exposed to very high loads, i.e. very high speeds. In such UHP (Ultra High Performance) tires, any weak spot owing to a winding that is not optimally embodied is immediately noticeable at very high speeds, either due to vibrations at very high vehicle speeds or an insufficient contact surface of the tire when braking at very high speeds. UHP tires are required in particular for vehicles with very high engine power, sports cars and racing cars.

The stability of UHP tires can be further increased if the rubber hoops can be wound about the belt at an increased tensile force. In this instance, it would be helpful if winding of this type takes place in the critical regions of the tire, particularly the shoulders of the tire. Due to the tensile force during winding, the bandage then bears even more tightly on the belt and thus prevents the growth in size of the tire even better. However, with the winding processes known so far, winding at a tensile force of 20 N up to 100 N is only possible to a very limited extent, because the rubber strip to be wound is no longer reliably held on the belt owing to the additional force being applied.

It is therefore the object of the invention to provide a vehicle tire, a system and a method for producing the latter, in which the quality and safety of the UHP tires is increased by an improved winding of the bandage about the belt.

SUMMARY

The object is achieved by a pneumatic vehicle tire according to patent claim 1.

This is a pneumatic vehicle tire with a belt consisting of at least one steel cord belt layer, which encircles the tire circumference, and a bandage which externally bears radially on the belt over the entire tire circumference, wherein the bandage consists of a rubber strip in which at least one cord of reinforcement fibers is contained, and this rubber strip in a winding direction relative to the circumferential direction of the pneumatic vehicle tire is wound about the belt at least from one axial end of the belt up to at least the other axial end of the belt, wherein the ratio of the component of the winding direction in the axis direction A to the component of the winding direction in the circumferential direction along the rubber strip is less than 0.01, and does not vary by more than 2% over at least 70% of the width of the belt in the axis direction A, wherein the spacing of two neighboring cords in two adjacent portions of the rubber strip at each circumferential position does not vary by more than 5% in comparison to the spacing of the cords in the rubber strip, and the cords in the bandage are subjected to a tension of at least 3 N/mm$^2$ over at least 25% of the width of the belt in the axis direction A.

As a UHP tire, a pneumatic vehicle tire of this type has a belt with steel cords, which consists of at least one steel cord belt layer, which encircles the tire circumference, as well as a bandage which externally bears radially on the belt over the entire tire circumference. In the pneumatic vehicle tire according to the invention, this bandage consists of a single rubber strip containing at least one cord of reinforcement fibers in order to in this way counteract the radial expansion of the pneumatic vehicle tire at high speeds. The rubber strip is wound about the belt from at least one axial end of the belt up to at least the other axial end of the belt, almost in the circumferential direction of the pneumatic vehicle tire.

In the pneumatic vehicle tire according to the invention, the bandage thus consists of only one rubber strip which is wound about the belt of the pneumatic vehicle tire almost parallel to the circumferential direction of the pneumatic vehicle tire. The winding must be guided about the belt at least over the entire width of the pneumatic vehicle tire in order to achieve uniform winding and to prevent radial expansion of the pneumatic vehicle tire over the entire tire width. Since the width of the pneumatic vehicle tires extends in the axis direction A of the pneumatic vehicle tire, wherein strictly speaking the width is parallel to the rotation axis A of the pneumatic vehicle tire the pneumatic vehicle tire— and accordingly also the belt of the pneumatic vehicle tire that stabilizes the pneumatic vehicle tire in the radial direction of the latter and runs in the circumferential direction— also has axial ends in the axis direction A. In order to now stabilize the belt of the pneumatic vehicle tire uniformly by the bandage, the winding of the bandage by means of the rubber strip must run at least from one axial end of the belt up to at least the other axial end of the belt, specifically almost in the circumferential direction of the tire.

Accordingly, in a pneumatic vehicle tire according to the invention, the winding direction of the rubber strip relative to the circumferential direction of the pneumatic vehicle tire is such that the ratio of the winding direction component in the axis direction A to the winding direction component in the circumferential direction along the rubber strip is less than 0.01, and does not vary by more than 2% over at least 70% of the width of the belt in the axis direction A. The direction of the winding of the rubber strip therefore also has a very small component in the axis direction A. This is necessary in the first place because the rubber strip of the bandage has a smaller width than the belt of the pneumatic vehicle tire. Accordingly, the rubber strip is to be wound about the belt so as to be offset multiple times in the axis direction, so that the bandage can extend from one axial end of the belt up to at least the other axial end of the belt. According to the width of the rubber strip, an offset is already to be provided by the component of the winding direction of the rubber strip in the axis direction A, which corresponds to the width of the rubber strip. In a pneumatic vehicle tire according to the invention, this component of the winding direction should nevertheless be very small and its ratio to the component of the winding direction in the circumferential direction should be less than 0.01. Accordingly, the winding direction of the rubber strip deviates only so far from the circumferential direction that the offset of adjacent portions of the rubber strip, which are disposed adjacent to one other in the axis direction A, is provided in this specific way at each circumferential position. This winding direction, strictly speaking its relative component in the axis direction A, should not vary by more than 2% over at least 70% of the width of the belt in the axis direction A, i.e. be almost constant in the axis direction in this region. In general, the belt should in fact be uniformly wrapped with the rubber strip of the bandage over the entire width in the axis direction A, in order for any growth in the size of the tire to be precluded by the bandage. Only by deforming, in particular bending, the belt and bandage of the tire green in the vulcanizing press during later vulcanizing of the pneumatic vehicle tire, in which the tire is imparted the shape defined by the vulcanizing mold, the case often arises that this uniform arrangement can be changed in the shoulder regions of the tire, i.e. at the axial ends of the belt. Therefore, it is possible that a tire according to the invention, after completion of its production, the ratio of the component of the winding direction of the rubber strip in the axis direction A to the component of the winding direction in the circumferential direction does not vary by more than 2% in the finished pneumatic vehicle tire over the entire width, but only in a smaller width of the belt in the axis direction, which however still represents at least 70% of the width.

A pneumatic vehicle tire according to the invention has such a good winding of the rubber strip of the bandage that the spacing of the two neighboring cords in two adjacent portions of the rubber strip at each circumferential position does not vary by more than 5% in comparison to the spacing of the cords in the rubber strip, and that the cords in the bandage are subjected to a tension of at least 3 N/mm$^2$ over at least 25% of the width of the belt in the axis direction A. These two properties of the pneumatic vehicle tires according to the invention are essential in terms of the improvement of quality and safety of a pneumatic vehicle tire according to the invention in comparison to known UHP tires as a result of the improved winding of the bandage about the belt. In that, even in the case of two neighboring cords in two adjacent portions of the rubber strip, their spacing at each circumferential position does not vary by more than 5% in comparison to the spacing of the cord in the rubber strip, a very homogeneous disposal of the cords of the reinforcement fibers in the axis direction A of the pneumatic vehicle tire is achieved. Therefore, no local deviations can lead to a weak spot in the pneumatic vehicle tire, which enable a local growth of the tire in the radial direction, which at very high vehicle speeds can cause vibrations or an insufficient contact surface of the tire during braking, which will affect the safety of the pneumatic vehicle tire at these critical moments. In addition, the increased tension of at least 3 N/mm$^2$ in the cords of the bandage ensures further stability of the pneumatic vehicle tire in the radial direction, so that any growth in the tire at high speeds and its resultant negative consequences are further reduced.

These properties of the pneumatic vehicle tires according to the invention are achieved in particular with the likewise claimed production system for pneumatic vehicle tires and the likewise claimed associated production method for pneumatic vehicle tires.

In a preferred embodiment of the pneumatic vehicle tire according to the invention, the spacing of the two neighboring cords in two adjacent portions of the rubber strip at each circumferential position does not vary by more than 2% in comparison to the spacing of the cords in the rubber strip. Particularly preferably, this spacing does not vary by more than 1% in comparison to the spacing of the cords in the rubber strip, and most particularly preferably, this spacing does not vary by more than 0.5% in comparison to the spacing of the cords in the rubber strip. Due to the even greater homogeneity of the disposal of the cords of the reinforcement fibers, the local deviations of the stabilizing bandage are even smaller. Accordingly, the risk of a weak spot in the pneumatic vehicle tire, which can lead to a safety-relevant issue, is further reduced here.

In another preferred embodiment of the pneumatic vehicle tire according to the invention, the ratio of the component of the winding direction of the bandage in the axis direction A to the component of the winding direction in the circumferential direction does not vary by more than 1%, preferably does not vary by more than 0.5%, and particularly preferably does not vary by more than 0.2%, over at least 70% of the width of the belt in the axis direction A. This reduced deviation in the winding direction of the rubber strip of the bandage also further reduces the risk of local deviations of the stabilizing bandage and corresponding weak spots of the pneumatic vehicle tire, which can lead to a safety-relevant issue.

In a further preferred embodiment of the pneumatic vehicle tire according to the invention, the cords in the bandage are subjected to a tension of at least 3 N/mm$^2$ over at least 40% of the width of the belt in the axis direction A, preferably are subjected to a tension of at least 3 N/mm$^2$ over at least 60% of the width of the belt in the axis direction A, and particularly preferably are subjected to a tension of at least 3 N/mm$^2$ over at least 80% of the width of the belt in the axis direction A. As a result of the extended region of the width of the pneumatic vehicle tire in which the cords are under an increased tension, the stability of a pneumatic vehicle tire according to the invention is further increased in the extended region, as a result of which growth in the tire and its resultant consequences are further counteracted.

In another preferred embodiment of the pneumatic vehicle tire according to the invention, the cords in the bandage are subjected to a tension of at least 12 N/mm$^2$, preferably subjected to a tension of at least 30 N/mm$^2$, and particularly preferably subjected to a tension of at least 80 N/mm$^2$, over at least 25% of the width of the belt in the axis direction A, preferably over at least 40% of the width of the belt in the axis direction A, particularly preferably over at least 60% of the width of the belt in the axis direction A, and most particularly preferably over at least 80% of the width of the belt in the axis direction A. Due to the increased tension in the cords of the bandage, the pneumatic vehicle tires of this embodiment are also suitable for very high speeds, such as racing sport speeds and extreme speeds, without the weak spots of the pneumatic vehicle tire then leading to a safety-relevant issue. Here, the stabilization by the cords and the very uniform winding and disposal of the cords interact in a constructive manner. The pneumatic vehicle tires of these embodiments also meet the demands of very high torques of an electric drive, particularly in racing, such as in Formula E, for example.

In specific ones of these embodiments of a pneumatic vehicle tire according to the invention, the tension to which the cords in the bandage are subjected fluctuates only insignificantly, i.e. only by at most 5%, preferably only by 1%, and preferably only by 0.3%, over 25%, 40%, 60% or 80% of the width of the belt in the axis direction A. As a result of this uniform winding under constant tension, any still possible growth in the size of the tire in the radial direction in the axis direction A of the pneumatic vehicle tire is kept constant, thus enabling an almost optimal contact surface of the pneumatic vehicle tire over the respective width of the pneumatic vehicle tire. This is particularly advantageous if the uniform winding in the two shoulder regions of the pneumatic vehicle tire is present at a high tension, so that optimal contact surfaces are not prevented by weak spots even in these regions of the pneumatic vehicle tires that are rather unstable due to the ends of the belt and the bandage. Here, a high-quality embodiment of the bandage compensates for the weak spot of the terminating belt. Therefore, the cords of the bandage in regions of at least 12.5% and particularly preferably 20% of the width of the pneumatic vehicle tire in the axis direction A close to the two shoulder regions of a pneumatic vehicle tire according to the invention, on which belts and/or treads of the pneumatic vehicle tire transition to the side walls of the latter, are preferably subjected to an increased tension of at least 12 N/mm$^2$, preferably of at least 30 N/mm$^2$, and particularly preferably at least 80 N/mm$^2$, which tension in these regions fluctuates only by at most 5%, preferably only by 1%, and preferably only by 0.3%. Between these regions, the tension of the cords may be lower and/or fluctuate more.

In embodiments of the pneumatic vehicle tires according to the invention, the rubber strip in one direction is wound relative to the circumferential direction of the pneumatic vehicle tire so that the ratio of the component of the direction in the axis direction A to the component of the direction in the circumferential direction along the rubber strip, does not vary by more than 2%, preferably does not vary by more than 1%, particularly preferably does not vary by more than 0.5%, and most particularly preferably does not vary by more than 0.2%, over at least 85% of the width of the belt in the axis direction, preferably the entire width of the belt in the axis direction. As a result of this even more uniform winding of the bandage, a large contact area of the pneumatic vehicle tire and small irregularities of the tread of the pneumatic vehicle tire are provided even better.

In some embodiments of the pneumatic vehicle tire according to the invention, the rubber strip is wound in a winding direction relative to the circumferential direction of the pneumatic vehicle tire, in which the ratio of the component in the axis direction A to its component in the circumferential direction along the rubber strip is less than 0.005, preferably less than 0.002. Accordingly, the cords in the bandage of the pneumatic vehicle tire are aligned particularly precisely in the circumferential direction, this contributing even better toward stabilizing the pneumatic vehicle tire. Such a small ratio is possible above all if the width of the wound rubber strip is not so large and, for example, is only at most 6 mm, preferably at most 4 mm, and particularly preferably at most 3 mm, or the number of cords in the rubber strip is rather small, so that not more than six cords, preferably not more than four cords, and particularly preferably not more than two cords, are present in the wound rubber strip.

In particular, vehicle tires according to the invention are characterized in that, in the region of the optimized winding of the bandage, all cords of the bandage lie in a very orderly manner next to one another in the axis direction A. An overlap of the cords is precluded. Accordingly, the cords all have ideally the same position in the radial direction. Accordingly, in the pneumatic vehicle tires according to the invention, the spacing in the radial direction of two cords of two adjacent portions of the rubber strip is typically not more than 5% of the spacing of the cords in the rubber strip, preferably not more than 1% of the spacing of the cords in the rubber strip, when the rubber strip in a specific region in the axis direction A of the pneumatic vehicle tire is wound in a direction relative to the circumferential direction of the pneumatic vehicle tire in which the ratio of the component of said winding direction in the axis direction A to the component of said winding direction in the circumferential direction is less than 0.01, and does not vary by more than 2%.

Typically, there is a uniform spacing between the cords in the rubber strip of a pneumatic vehicle tire according to the invention, which is between 0.3 mm and 2 mm, preferably between 0.8 mm and 1.5 mm, and particularly preferably between 1 mm and 1.3 mm, and herein varies by at most 3%, preferably varies by at most 1.5%, and particularly preferably varies by at most 0.5%.

Furthermore, in a rubber strip of a pneumatic vehicle tire according to the invention, typically two to fifteen cords are disposed next to one another, preferably four to twelve cords, and particularly preferably seven to ten cords.

Usually, the at least one cord contained in the rubber strip of a pneumatic vehicle tire according to the invention consists of nylon fibers, aramid fibers, polyester fibers, or rayon fibers.

The at least one cord contained in the rubber strip of a pneumatic vehicle tire according to the invention preferably consists of 100 to 300 nylon fibers or 700 to 1300 aramid fibers, wherein preferably the fibers are present as two to five yarns of the fibers in a cord, which are twisted, twisted about one another, or braided in the cord.

Typically, the rubber material of the rubber strip of a pneumatic vehicle tire according to the invention has carbon black as a filler. Usually, the rubber material of the rubber strip of a pneumatic vehicle tire according to the invention is an isotropic material. In most instances, the rubber material is a casing of the cords, which has been applied as a coating, for example.

Preferably, the rubber strip of a pneumatic vehicle tire according to the invention is also wound beyond the axial ends of the belt in the axis direction A, typically even by 5% of the width of the belt in the axis direction A beyond the end of the belt, preferably even by 10% of the width of the belt in the axis direction A beyond the end of the belt. This ensures that the belt is indeed stabilized by the bandage over the entire belt and especially beyond the lateral ends of said belt. This measure also counteracts a possible weak spot of a pneumatic vehicle tire in the shoulder region.

In preferred embodiments of the pneumatic vehicle tire according to the invention, the wound rubber strip of the bandage, at least at one of its axial ends, may also have a further winding which at least partially has the same position in the axis direction A as a further winding of the rubber strip. At the end of the wound rubber strip, a second winding of the rubber strip is then consciously placed at least partially over a first winding of the rubber strip so as to thereby better fasten the wound rubber strip in relation to slippage at the axial end of the latter. The region in which this further winding of the rubber strip is present in this instance is not part of the at least 70% of the width of the belt in the axis direction A with the optimized winding of the rubber strip, in which the ratio of the component of the winding direction of the rubber strip in the axis direction A to the component of the winding direction of the rubber strip in the circumferential direction along the rubber strip is less than 0.01, and does not vary by more than 2%, and wherein the spacing of two neighboring cords in two adjacent portions of the rubber strip at each circumferential position do not vary by more than 5% in comparison to the spacing of the cords in the rubber strip.

The belt of the pneumatic vehicle tires according to the invention can consist of only one steel cord belt layer which encircles the tire circumference, wherein the direction of the steel cord does not deviate more than 3° from the circumferential direction of the pneumatic vehicle tire, preferably not more than 1° from the circumferential direction, and particularly preferably not more than 0.3° from the circumferential direction.

The belt of the pneumatic vehicle tires according to the invention can consist of two steel cord belt layers which encircle the tire circumference, wherein the direction of the steel cords in both belt layers deviates from the circumferential direction of the pneumatic vehicle tire in both steel cord belt layers by at most 2°, preferably at most 0.5° by the same angle, the direction of the steel cords in terms of the axis direction A however points in the opposite direction in both belt layers. The steel cords of both belt layers are in this instance disposed almost symmetrically to the circumferential direction of the pneumatic vehicle tire, having a main component in the circumferential direction. Typically, the direction of the steel cords here deviates by an angle of 0° to 45° from the circumferential direction. However, belts in which the direction of the steel cords deviates by an angle of 22° to 36° from the circumferential direction are preferred.

The object is also achieved by a system for producing a pneumatic vehicle tire according to patent claim 6.

A system according to the invention serves for producing a pneumatic vehicle tire with a belt consisting of at least one steel cord belt layer, which encircles the tire circumference, and a bandage which externally bears radially on the belt over the entire tire circumference. The system according to the invention has a rotatable drum on which the belt is positioned, a feed device which feeds a bandage, the latter consisting of a rubber strip in which at least one cord of reinforcement fibers is contained, to the rotatable drum, and a contact pressure device which presses the bandage onto the belt positioned on the rotatable drum when said bandage is being wound about the belt by the rotation of the drum.

The system according to the invention carries out a production step in the production of a pneumatic vehicle tire which has a belt consisting of at least one steel cord belt layer, which encircles the tire circumference, and a bandage which externally bears radially on this belt over the entire tire circumference. In the manufacturing step, the bandage is wound radially outside about the belt over the entire tire circumference.

The system according to the invention here comprises the following components which participate in the winding process:

A rotatable drum on which the belt is positioned.

In the process, the steel cord belt layers, which prior thereto have been cut to size, are deposited successively, or the only steel cord belt layer cut to size is deposited, on the external circumference of the drum, respectively, so that the steel cord belt layer(s) cover(s) exactly the outer circumference of the drum without overlapping itself/themselves. The rotatable drum has a drive, or is connected to a drive, that allows the rotatable drum to rotate about the rotation axis A of the drum during the winding process of the bandage. Depending on the actuation of the drive and on the winding process, the drum can be operated during the winding process with a constant, in particular fixedly defined, or a variable rotating speed.

A feed device which feeds a bandage to the rotatable drum.

The bandage fed by the feed device consists of a rubber strip in which at least one cord of reinforcement fibers is contained. The purpose of this bandage in the produced tire is to counteract the radial expansion of the pneumatic vehicle tire at high speeds.

A contact pressure device that presses the bandage onto the belt positioned on the rotatable drum when said bandage is wound about the belt by the rotation of the drum.

The contact pressure device presses onto the rubber strip of the bandage when the latter by the winding procedure has been wound onto the belt which has been positioned on the rotatable drum. In particular, the contact pressure device during the progressive winding process of the rubber strip can press the already wound part of the rubber strip onto the belt lying below the rubber strip at a specific pressure. By pressing down the wound rubber strip it is prevented that the rubber strip can move from its position on the belt. Accordingly, the contact pressure roller ensures that a rubber strip, once positively wound, remains in position until the end of the winding process of the bandage. This prevents local deviations in the winding of the bandage, which can ultimately lead to weak spots in the finished pneumatic vehicle tire, which can cause vibrations or an insufficient contact surface of the tire when braking at high and very high vehicle speeds. In particular with UHP tires, the improved winding process in the system according to the invention therefore contributes to the quality and safety of said UHP tires.

In a preferred embodiment of the system according to the invention, the feed device and rotatable drum during winding of the bandage are moved relative to one other so that the rubber strip of the bandage is wound about the belt at least from one axial end of the belt up to at least the other axial end of the belt.

The winding of the bandage is preferably to be guided about the belt at least over the entire width of the pneumatic vehicle tire in order to achieve uniform winding and to prevent radial expansion of the pneumatic vehicle tire over the entire tire width. Therefore, the winding of the bandage by means of the rubber strip is to be performed at least from one axial end of the belt up to at least the other axial end of the belt, specifically preferably almost in the circumferential direction of the tire. As a result of this expansion of the winding of the rubber strip, weak spots of a pneumatic vehicle tire in the peripheral region of the belt are avoided, which further increases the quality and safety of the pneumatic vehicle tire.

In a preferred embodiment of the system according to the invention, as a result of the movement of the feed device relative to the rotatable drum, the rubber strip is wound in a winding direction relative to the circumferential direction of the belt, in which the ratio of the component of said winding direction in the axis direction A, the rotation axis of the drum, to the component of said winding direction in the circumferential direction is less than 0.01, and does not vary by more than 2% over at least 85% of the width of the belt in the axis direction. This very uniform winding mode is maintained by pressing the rubber strip onto the belt by means of the contact pressure device during winding and leads to a very uniform disposal of the cords of the bandage in the produced pneumatic vehicle tire at the end of the manufacturing process, so that said pneumatic vehicle tire then has few weak spots which are negatively affected by growth in the tire in the radial direction at high speeds.

In a particularly preferred embodiment of the system according to the invention, as a result of the movement of the feed device relative to the rotatable drum, the rubber strip is wound in a winding direction relative to the circumferential direction of the belt in which the ratio of the component of said winding direction in the axis direction A to the component of said winding direction in the circumferential direction along the rubber strip does not vary by more than 2%, preferably does not vary by more than 1%, particularly preferably does not vary by more than 0.5%, and most preferably does not vary by more than 0.2%, over at least 95% of the width of the belt in the axis direction, preferably the entire width of the belt in the axis direction. A pneumatic vehicle tire manufactured on such a system has even fewer or smaller weak spots which are negatively affected by growth in the tire in the radial direction at high speeds.

In another preferred embodiment of the system according to the invention, when winding the bandage, the rubber strip of the bandage as a result of the rotation of the rotatable drum is wound at a tensile force of 10 N to 200 N, preferably at a tensile force of 50 N to 150 N, and particularly preferably at a tensile force of 80 N to 120 N, over at least 25% of the width of the belt in the axis direction A. The tensile force is exerted on the rubber strip to be wound by the winding of the rubber strip as a result of the drive of the rotating drum, and by a counterforce which in the feed device counteracts the winding process, e.g. in that a spring force acts on the rubber strip in the feed device, e.g. via a pilot roller or a guide element. The tension thus introduced into the cords of the wound rubber strip is also maintained by further forming steps during the following production steps in the finished pneumatic vehicle tire, or is even increased, and this increases the stability of the pneumatic vehicle tire in the radial direction, so that any growth in the tire at high speeds and resultant negative consequences are further reduced. With the system according to the invention, winding procedures can in particular be carried out at very high tensile forces, without the wound rubber strip of the bandage slipping. These high tensile forces can also be applied only over a specific width of the belt during winding, especially in an region where weak spots have a particularly strong effect, such as the shoulder region of a pneumatic vehicle tire.

This region is advantageously further extended in a preferred embodiment of the system according to the invention. In this embodiment, when winding the bandage, the rubber strip of the bandage, as a result of the rotation of the rotatable drum, is wound at a tensile force of 10 N to 200 N, preferably at a tensile force of 50 N to 150 N, and particularly preferably at a tensile force of 80 N to 120 N over at least 40% of the width of the belt in the axis direction A, particularly preferably over at least 60% of the width of the belt in the axis direction A, and most particularly preferably over at least 80% of the width of the belt in the axis direction A.

In another preferred embodiment of the system according to the invention, the tensile force at which the rubber strip is wound varies by 10 N to 140 N, preferably by 50 N to 80 N over at least 60% of the width of the belt in the axis direction A. As a result of a variation of this type, owing to a high tension in the cords of the bandage, a stabilization in relation to radial growth in the tire can then take place in particularly critical regions also in the completed pneumatic vehicle tire, while the tension in the cords is kept low in other regions. This, too, can altogether prevent radial tire growth and the associated negative consequences in a targeted manner in critical regions of the tire such as its shoulders, while in non-critical areas such as the apex of the tire this is not necessary.

In another embodiment of the system according to the invention, the rubber strip in the region of the belt which extends from an axial end of the belt up to a region of the belt which in the axis direction A has a spacing from this axial end of the belt of at least 10% of the width of the belt in the axis direction A, preferably which in the axis direction A has a spacing of at least 20% of the width of the belt in the axis direction A, and particularly preferably which in the axis direction A has a spacing of 25% to 30% of the width of the belt in the axis direction A, is wound about the belt at a tensile force of 50 N to 200 N. With a system of this type in particular, a pneumatic vehicle tire, in particular a UHP tire, can be produced, which is stabilized in its shoulder region by high tensions in the cords of the bandage, therefore has fewer weak spots here due to radial growth, and can therefore be used at even higher speeds, without exhibiting vibrations and reduced braking behavior at these speeds, for example.

In another embodiment of the system according to the invention, as a result of the movement of the feed device relative to the rotatable drum, the rubber strip is wound and positioned on the belt by the contact pressure device in such a way that the spacing between the two neighboring cords in two adjacent portions of the rubber strip at each circumferential position does not vary by more than 2% in comparison to the spacing of the cords in the rubber strip, preferably does not vary by more than 1% in comparison to the spacing of the cords in the rubber strip, and particularly preferably does not vary by more than 0.5% in comparison to the spacing of the cords in the rubber strip. Here, the contact pressure device substantially contributes to the fact that the position of the rubber strip and the cords thereof during the winding process of the bandage cannot change, and a very uniform winding of the bandage is thus present, by which a very uniform tire geometry is then provided in the finished tire. In particular, any weak spots of the tire due to an unfavorable mutual disposal of the cords are avoided.

In a preferred embodiment of the system according to the invention, as a result of the movement of the feed device relative to the rotatable drum, the rubber strip in a winding direction relative to the circumferential direction of the pneumatic vehicle tire is wound in such a way that the ratio of the component of the winding direction of the bandage in the axis direction A to the component of the winding direction in the circumferential direction does not vary by more than 1%, preferably does not vary by more than 0.5%, and particularly preferably does not vary by more than 0.2%, over at least 70% of the width of the belt in the axis direction. With such guiding, the finished pneumatic vehicle tire exhibits even fewer weak spots.

In another embodiment of the system according to the invention, the tensile force at which the rubber strip is wound fluctuates only by at most 5%, preferably only by 1%, and particularly preferably only by 0.3%. The finished tire is then subjected in a corresponding homogeneous manner to an almost constant tension, which also avoids issues due to uneven radial growth.

In another embodiment of the system according to the invention, the rubber strip is wound in a winding direction relative to the circumferential direction of the belt, in which the ratio of its component in the axis direction A to its component in the circumferential direction of the belt is less than 0.005, preferably less than 0.002. This optimal alignment of the cords of the bandage in the circumferential direction increases the stabilization of the finished pneumatic vehicle tire.

In a preferred embodiment of the system according to the invention, the rubber strip is wound by the movement of the feed device relative to the rotatable drum and positioned on the belt by the contact pressure device in such a way that the spacing in the radial direction of two cords of two adjacent portions of the rubber strip is not more than 5% of the spacing of the cords in the rubber strip, preferably not more than 1% of the spacing of the cords in the rubber strip. The pneumatic vehicle tires manufactured by this system are characterized in that at least in one region of the winding of the bandage in the axis direction A, all cords of the bandage lie in a very orderly manner next to one another in the axis direction A. An overlap of the cords is precluded. Accordingly, the cords all have ideally the same position in the radial direction.

In a preferred embodiment of the system according to the invention, the feed device and rotatable drum during winding of the bandage are moved relative to one other in such a way that the rubber strip is wound beyond the axial ends of the belt in the axis direction A of the rotatable drum, even by 5% of the width of the belt in the axis direction A of the rotatable drum, preferably even by 10% of the width of the belt in the axis direction A of the rotatable drum. With this winding process, the system ensures that the belt is stabilized by the bandage not only over the entire belt, but also beyond the lateral ends of the belt beyond the given length in the axis direction A. By this type of winding, a possible weak spot of a finished pneumatic vehicle tire in the shoulder region is counteracted in a targeted manner in that the edge region of the belt is completely enclosed by the bandage and is stabilized by the latter.

In a particular embodiment of the system according to the invention, the feed device and rotatable drum when winding the bandage are moved relative to one another in such a way that the rubber strip at least at one of its axial ends is additionally wound one more time, so that this winding and another of the windings of said rubber strip have at least partially the same position in the axis direction A. At the end of the wound rubber strip, a second winding of the rubber strip is then consciously placed at least partially over a first winding of the rubber strip so as to thereby better fasten the wound rubber strip in relation to slippage at the axial end of the latter.

Preferred embodiments of belts, which consist of at least one steel cord belt layer encircling the tire circumference and about which a bandage can be wound with a system according to the invention, have already been previously described in connection with the pneumatic vehicle tires according to the invention.

In a preferred embodiment of the system according to the invention, the contact pressure device is a contact pressure roller, the rotation axis $A_A$ thereof being parallel to the axis direction A of the rotatable drum and pressing the bandage onto the belt positioned on the rotatable drum. Between the contact pressure roller and the drum there is situated in each case a part of the rubber strip which is already positioned on the belt attached to the drum and which is held in position on the belt by the contact pressure roller. Thus, the already wound rubber strip can no longer move from its position. It is preferred here that the contact pressure roller is also set in rotation by the rotation of the drum. The spacing between the rotation axis A of the rotatable drum and the rotation axis $A_A$ of the contact pressure roller is chosen in such a way that the wound rubber strip is securely positioned between the belt located on the drum and the contact pressure roller. It should be noted that the rotation axis A of the drum corresponds exactly to the axis direction A of the finished pneumatic vehicle tire, about which the latter rotates later in driving operation. The symmetry of the tire is therefore defined by the drum on which the belt of the pneumatic vehicle tire is positioned. However, the further dimensions of the finished pneumatic vehicle tire are only defined in the production steps of the pneumatic vehicle tire that follow the winding process in the system according to the invention.

In a system of this type according to the invention, the contact pressure roller typically presses the bandage onto the belt at a pressure of 0.15 N/mm² to 1 N/mm², preferably a pressure of 0.18 N/mm² to 0.4 N/mm², and particularly preferably a pressure of 0.2 N/mm² to 0.3 N/mm². This ensures a reliable positioning of the rubber strip of the bandage, without excessive pressure changing the structure of the bandage and the belt.

In particular because of the low pressure, it is often sufficient that the contact pressure roller consists of a polymer material. This can be manufactured in a technologically simple way and is therefore cost-effective both in terms of material and production.

The object is also achieved by the production method of a pneumatic vehicle tire according to patent claim 9.

This here is a method for the production of a pneumatic vehicle tire with a belt consisting of at least one steel cord belt layer, which encircles the tire circumference, and a bandage which externally bears radially on the belt over the entire tire circumference, in which method, in a manufacturing step, the bandage consisting of a rubber strip in which at least one cord of reinforcement components is contained, is wound externally on the belt which is positioned on a rotatable drum, wherein the rubber strip is fed to the drum by means of a feed device: the rubber strip during winding is pressed onto the outside of the belt by means of a contact pressure device, and the fed rubber strip is wound by the rotation of the rotatable drum, wherein the axial position of the feeding head during winding moves uniformly from at least one axial end of the belt to the other.

With such a method, the pneumatic vehicle tires according to the invention can be manufactured in particular.

A method according to the invention serves for producing a pneumatic vehicle tire which has a belt consisting of at least one steel cord belt layer which encircles the tire circumference, and a bandage which externally bears radially on the belt over the entire tire circumference.

A manufacturing method according to the invention comprises, in addition to other usual steps of producing a pneumatic vehicle tire, a production step in which a bandage is wound onto the outside of the belt. The bandage here consists of only one rubber strip in which at least one cord of reinforcement fibers is contained. Such a rubber strip may of course also have several cords disposed next to one another in one direction, which in this instance have the same mutual spacing in the direction, except for specific tolerances. This direction runs perpendicularly to the longitudinal direction of the rubber strip, and the cords extend in the longitudinal direction of the rubber strip. Accordingly, a rubber strip has a very large length, the cords of the rubber strip running in the direction of said length, a width in the direction of which the cords are disposed next to one another, and in most instances a low height defined by the diameter of the cords and the rubber material surrounding the rubber strip, which is often simply its rubber casing.

Prior to the production step of the bandage winding, the belt has previously been positioned on a rotatable drum. The rubber strip during the manufacturing step is fed to the drum by means of a feed device. The fed rubber strip is wound by the rotation of the rotatable drum, specifically wound onto the belt which is positioned on the rotatable drum. In the process, the axial position of the feeding head moves uniformly from at least one axial end of the belt to the other during winding. Moreover, the rubber strip when being wound is pressed onto the outside of the belt by means of a contact pressure device.

It is essential in methods according to the invention that the rubber strip, while being wound, by means of the contact pressure device is additionally pressed onto the belt which is situated on the rotatable drum.

Pressing on the wound rubber strip prevents the rubber strip from moving from its position on the belt. Accordingly, the contact pressure roller ensures that a rubber strip, once positively wound, remains in position until the end of the winding process of the bandage. This prevents local variations in the winding of the bandage, which can ultimately lead to a weak spot in the finished pneumatic vehicle tire, which can cause vibrations or an insufficient contact surface of the tire when braking at high and very high vehicle speeds. The improved winding process in the system according to the invention therefore contributes to quality and safety, particularly in the case of UHP tires.

Just as with the production systems according to the invention, there are also preferred embodiments in the production method according to the invention that further improve the manufacturing process in order to produce even better pneumatic vehicle tires. The respective improvements are identical in the corresponding production systems and methods. These improvements are therefore no longer explicitly mentioned in the course of the production methods, and reference is made rather to the corresponding embodiment of a production system by which an embodiment of the production method can be carried out.

In one embodiment of the production method according to the invention, the rubber strip, as a result of a movement of the feed device along a movement axis $A_Z$ parallel to the axis direction A of the rotatable drum, is wound in a winding direction relative to the circumferential direction of the rotatable drum, wherein the ratio of the component of said winding direction in the axis direction A of the rotatable drum to the component of the direction of said winding direction in the circumferential direction is less than 0.01, and does not vary by more than 2% over at least 85% of the width of the belt in the axis direction A. Preferably, the ratio of the component of the winding direction in the axis direction A to the component of the winding direction in the circumferential direction along the rubber strip does not vary by more than 1%, particularly preferably by not more than 0.5% and most particularly preferably by not more than 0.2%, over at least 85% of the width of the belt in the axis direction A.

In another embodiment of the production method according to the invention, the rubber strip, as a result of a movement of the feed device along a movement axis $A_Z$ parallel to the axis direction A of the rotatable drum, is wound in a winding direction relative to the circumferential direction of the rotatable drum, wherein the ratio of the component of said winding direction in the axis direction A to the component of said winding direction in the circumferential direction is less than 0.01 over at least 95% of the width of the belt in the axis direction A, preferably the entire width of the belt in the axis direction, and does not vary by more than 2%, preferably does not vary by more than 1%, more preferably does not vary by more than 0.5%, and more particularly preferably does not vary by more than 0.2%.

In another embodiment of the production method according to the invention, the rubber strip, as a result of the movement of the feed device, the rotation of the rotatable drum and the pressing of the contact pressure device, is wound in such a way that the spacing between the two neighboring cords in two adjacent portions of the wound rubber strip at each circumferential position does not vary by more than 5% in comparison to the spacing between the cords in the rubber strip. The only exception to this is a previously described last winding of the rubber strip at its ends, which serves for fastening the latter. Preferably, the spacing between two neighboring cords in two adjacent portions of the wound rubber strip at each circumferential position in this instance varies by no more than 2% in comparison to the spacing of the cords in the rubber strip, particularly preferably by no more than 1% in comparison to the spacing of the cords in the rubber strip, and most particularly preferably by no more than 0.5% in comparison to the spacing of the cords in the rubber strip.

In one embodiment of the production method according to the invention, the rubber strip is wound at a tensile force of 10 N to 200 N, preferably at a tensile force of 50 N to 150 N and particularly preferably at a tensile force of 80 N to 120 N over at least 25% of the width of the belt in the axis direction A. Preferably, the rubber strip is wound at a tensile force of 10 N to 200 N, preferably at a tensile force of 50 N to 150 N and particularly preferably at a tensile force of 80 N to 120 N, over at least 40% of the width of the belt in the axis direction A, particularly preferably over at least 60% of the width of the belt in the axis direction A, and most particularly preferably over at least 80% of the width of the belt in the axis direction A.

In these embodiments of the production method according to the invention, the tensile force at which the rubber strip is wound can vary by 10 N to 140 N, preferably by 50 N to 80 N, over the at least 60% of the width of the belt in the axis direction A.

In one embodiment of the production method according to the invention, the rubber strip in the region of the belt which extends from an axial end of the belt up to a region of the belt which in the axis direction A has a spacing from this axial end of the belt of at least 10% of the width of the belt in the axis direction A, preferably which in the axis direction A has a spacing of at least 20% of the width of the belt in the axis direction A, and particularly preferably which in the axis direction A has a spacing of 25% to 30% of the width of the belt in the axis direction A, is wound about the belt at a tensile force of 50 N to 200 N.

If the rubber strip is wound at a tensile force in the above-mentioned exemplary embodiments, this tensile force fluctuates preferably only by at most 5%, particularly preferably only by 1%, and most particularly preferably only by 0.3%.

The rubber strip in the above-mentioned embodiments of the production method according to the invention is preferably wound by a movement of the feed device along a movement axis $A_Z$ parallel to the axis direction A of the rotatable drum in a winding direction relative to the circumferential direction of the rotatable drum, wherein the ratio of the component of said winding direction in the axis direction A to the component of said winding direction of the direction in the circumferential direction is less than 0.005, and in particular less than 0.002.

In preferred embodiments of the production method according to the invention, the rubber strips as a result of the movement of the feed device relative to the rotatable drum are wound, and positioned on the belt by the contact pressure device, in such a way that the spacing in the radial direction of two cords of two adjacent portions of the rubber strip is not more than 5% of the spacing of the cords in the rubber strip, preferably not more than 1% of the spacing of the cords in the rubber strip. The only exception to this is a previously described last winding of the rubber strip at its ends, which serves for fastening the latter.

Typically, two to fifteen cords, preferably four to twelve cords, and particularly preferably seven to ten cords, are disposed next to one another in the rubber strip, which is wound on the belt in the production methods according to the invention.

Between the cords in a rubber strip, which is wound on the belt in the production methods according to the invention, there is a uniform spacing which is typically between 0.3 mm and 2 mm, preferably between 0.8 mm and 1.5 mm, and particularly preferably between 1 mm and 1.3 mm, and herein varies by at most 3%, preferably varies by at most 1.5% and particularly preferably varies by at most 0.5%.

In a rubber strip, which is wound on the belt by a manufacturing method according to the invention, the at least one cord contained in the rubber strip usually consists of nylon fibers, aramid fibers, polyester fibers or rayon fibers.

In particular, the at least one cord contained in the rubber strip may consist of 100 to 300 nylon fibers or 700 to 1300 aramid fibers, wherein preferably the fibers are present in a cord as two to five yarns of the fibers which are twisted, intertwined, or braided in the cord.

In some embodiments of the production method according to the invention, the feed device and rotatable drum during winding of the bandage are moved relative to one another in such a way that the rubber strip is wound beyond at least one of the axial ends of the belt in the axis direction A of the rotatable drum even by 5% of the width of the belt in the axis direction A of the rotatable drum, preferably even by 10% of the width of the belt.

In other embodiments of the production method according to the invention, the feed device and rotatable drum when winding the bandage are moved relative to one another in such a way that the rubber strip at least at one of its axial ends is additionally wound one more time, so that this winding and another of the windings of said rubber strip have at least partially the same position in the axis direction A.

Belts on which the bandage is wound by a manufacturing method according to the invention can consist only of a steel cord belt layer encircling the tire circumference, wherein the direction of the steel cords does not deviate by more than 3° from the circumferential direction of the rotatable drum, preferably by not more than 1° from the circumferential direction, and particularly preferably by not more than 0.3° from the circumferential direction, when the belt is positioned on the rotatable drum.

Belts on which the bandage is wound with a manufacturing method according to the invention, can consist of two steel cord belt layers circulating over the tire circumference, wherein the direction of the steel cord in both belt layers from the circumferential direction of the rotatable drum in both steel cord belt layers deviates up to at most 2°, preferably at most 0.5° by the same angle and the direction of the steel cords relative to the axis direction A of the rotatable drum in the opposite direction at both belt layers when the belt is positioned on the rotatable drum. The steel cords of both belt layers are disposed almost symmetrically to the circumferential direction of the rotatable drum, with a main component in the circumferential direction. Typically, the direction of the steel cords deviates by an angle of 0° and 45° from the circumferential direction. However, belts in which the direction of the steel cords deviates by an angle of 22° and 36° from the circumferential direction are preferred.

Typically, in the production method according to the invention, a contact pressure roller, which preferably consists of a polymer material is used as a pressure device that presses the rubber strip onto the outside of the belt during winding.

The contact pressure device, in particular when it is a contact pressure roller, during the production step of winding the bandage about the belt in a production method according to the invention, typically presses the rubber strip onto the outside of the belt at a pressure of 0.15 N/mm² to 1 N/mm², preferably a pressure of 0.18 N/mm² to 0.4 N/mm², and particularly preferably a pressure of 0.2 N/mm² to 0.3 N/mm².

All embodiments of the pneumatic vehicle tires, production systems and production systems according to the invention reproduced in this description are merely examples of the design embodiment of the invention. Accordingly, further embodiments of the invention, which are the subject matter of the invention, unless explicitly explained otherwise in the description, are also provided by individual or a plurality of features of one embodiment, alone or by the combination of the features of different embodiments.

BRIEF DESCRIPTION OF THE DRAWINGS

The invention is to be explained in more detail by way of a plurality of exemplary embodiments. In the drawings.

DETAILED DESCRIPTION OF THE INVENTION

Figure 1:
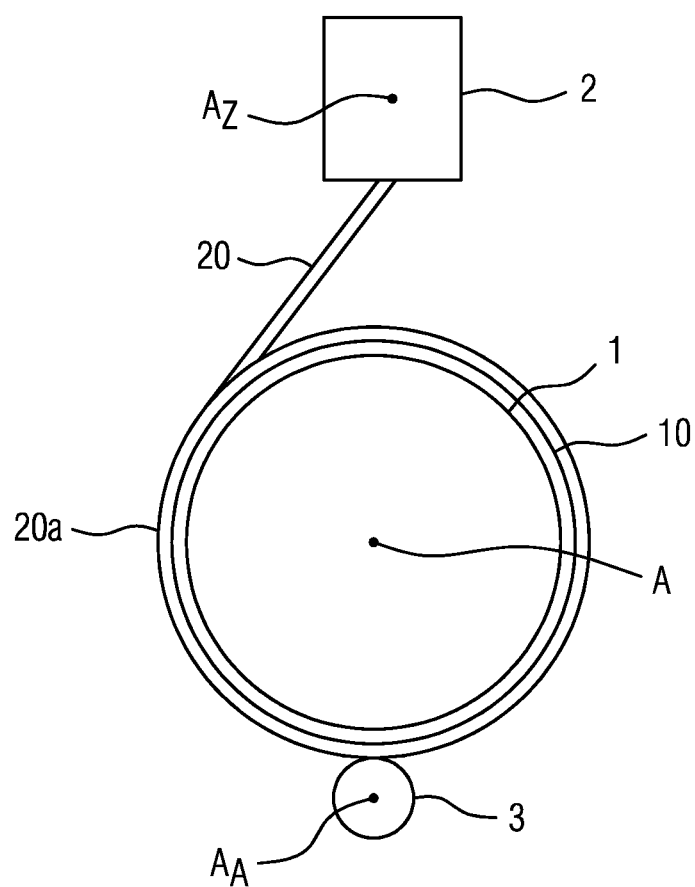
FIG. 1: shows a system according to the invention for winding a bandage on a belt, when viewed in the direction of the rotation axis A.
Figure 2:
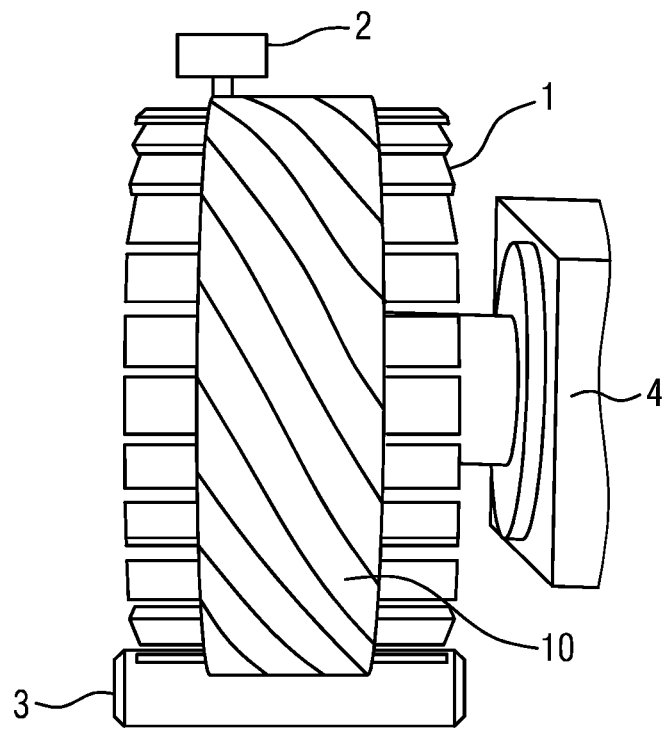
FIG. 2: shows a system according to the invention for winding a bandage on a belt, the viewing plane being parallel to the rotation axis A.
Figure 3:
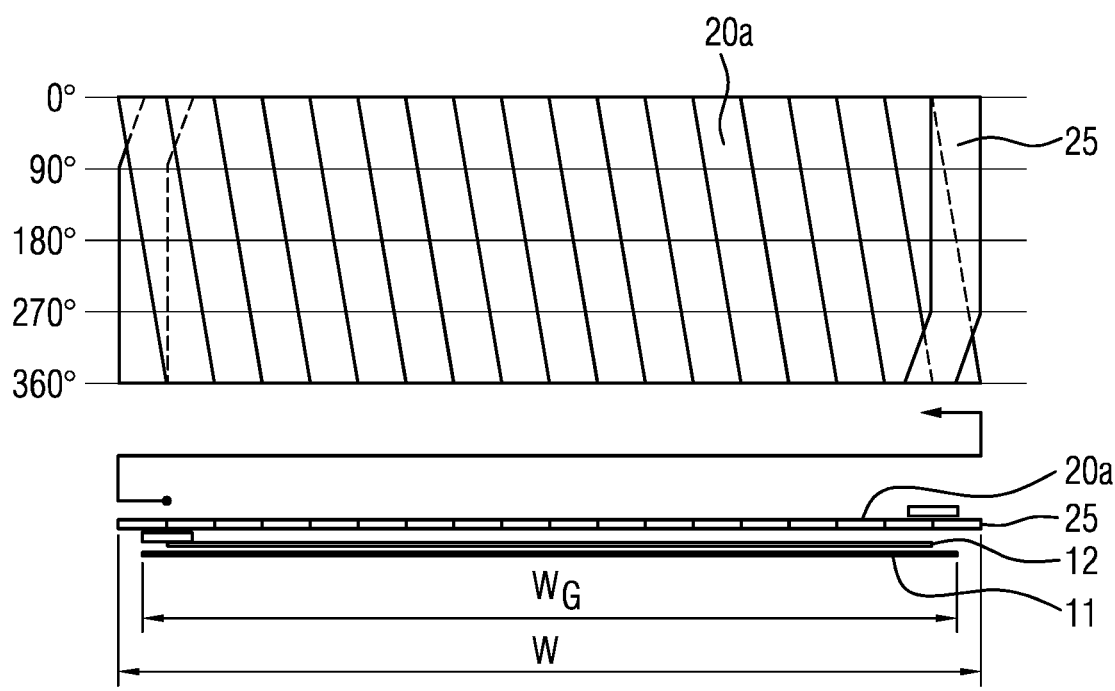
FIG. 3: shows an image of a wound bandage as a developed view in the circumferential face and a cross-section parallel to the rotation axis.
Figure 4:
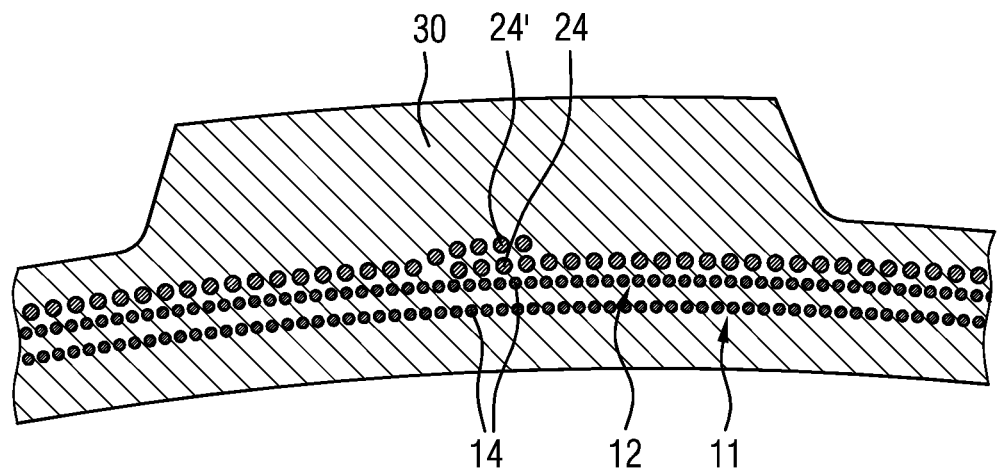
FIG. 4: shows a cross-section of a finished pneumatic vehicle tire according to the prior art with winding faults.
Figure 5:
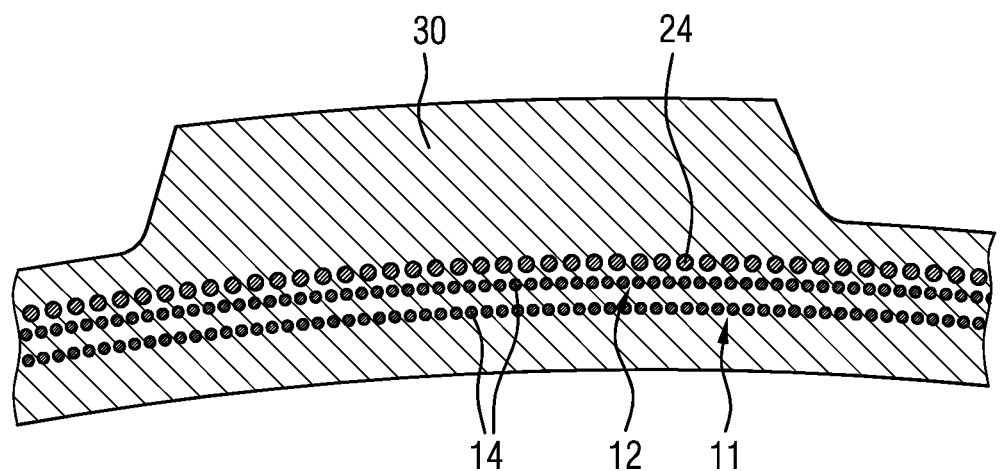
FIG. 5: shows a cross-section of a pneumatic vehicle tire according to the invention.
Figure 6:
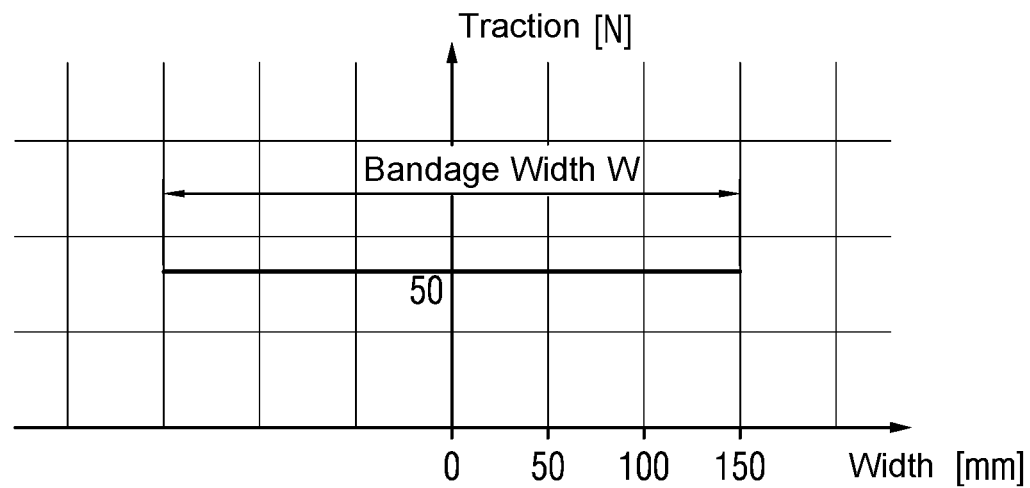
FIG. 6: shows a tensile force distribution in the axis direction A of an uniformly wound bandage.
Figure 7:
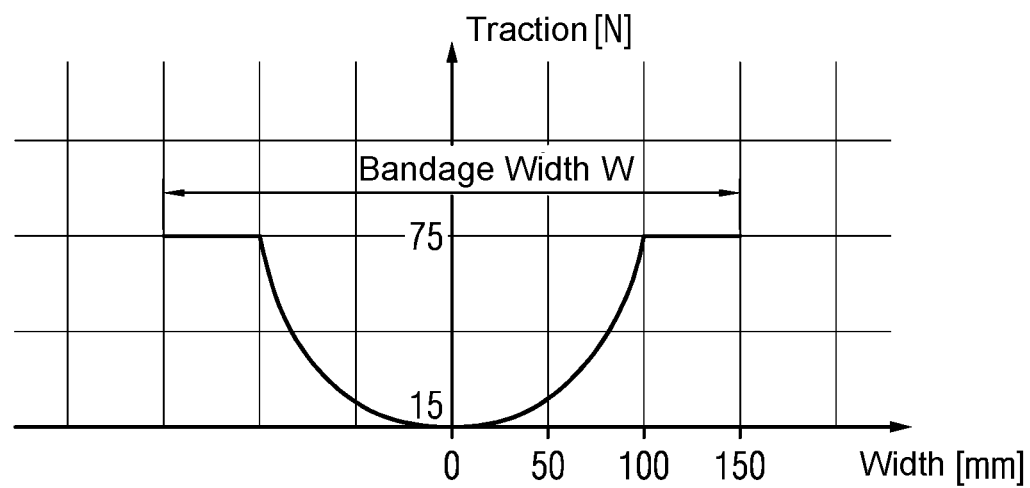
FIG. 7: shows a tensile force distribution in the axis direction A of a bandage which in the peripheral region of the belt is wound at higher tensile forces.

Shown schematically in FIGS. 1 and 2 is a system according to the invention for producing a pneumatic vehicle tire, in which a bandage is wound about a belt 10 of a pneumatic vehicle tire. A pneumatic vehicle tire manufactured with such a system has a belt which consists of at least one layer of steel cords surrounded by a rubber material, i.e. a steel cord belt layer. In the inventive system shown, and in the associated production method according to the invention, the belt 10 is wound about a rotatable drum 1. This rotatable drum 1 rotates about its axis of rotation A, i.e. the axis direction of the drum. The rotatable drum 1 is driven by a drive 4 shown in FIG. 2. This drive transmits a rotation to the drum 1 via a rotating shaft. Besides the belt 10, a pneumatic vehicle tire, which is to be manufactured on a system according to the invention, also has a bandage. This bandage externally bears radially on the belt 10. The belt 10 of the pneumatic vehicle tire encircles the entire circumference of the pneumatic vehicle tire. Accordingly, this is also the bandage. The pneumatic vehicle tire, which is produced with the system according to the invention, has a bandage consisting of the single rubber strip 20. In the production step of the production method according to the invention, this rubber strip 20 is now wound about the belt 10. The rubber strip 20a, which is already wound, is shown in FIG. 1. However, this rubber strip in FIG. 1 is only partially wound. A feeding head 2 is also shown in the production system. The rubber strip 20 is fed to the rotatable drum 1 via this feeding head 2. The rubber strip is wound from the feeding head in the direction of the rotatable drum 1. When the beginning of the rubber strip 20 reaches the rotatable drum 1 at the beginning of the winding process, the rubber strip 20 adheres to the belt 10. This is due to the different rubber materials of which the belt and the rubber strip are composed. It is essential that reinforcing cords are embedded in the belt 10 as well as in the rubber strip 20. The cords of the belt here consist of steel cords 14. These cords are then coated with a rubber material to form a steel cord belt layer or a plurality of steel cord belt layers 11 and 12. In the rubber strip, on the other hand, there is situated at least one cord 24 made of reinforcement fibers. As a result of the rotatable drum 1 being rotated when impacted by the rubber strip 20, the rubber strip 20 is wound onto the belt 10 which is already situated on the drum. In this technology known from the prior art, however, there is the issue that the wound rubber strip 20a can move from its position during the further winding process and thus the winding defined by the position of the feeding head is no longer exactly present. As previously described, a displacement of the wound rubber strip 20a leads to weak spots in the pneumatic vehicle tires completed according to further known method steps, which have a very negative effect, particularly at high vehicle speeds. In order to ensure the position of the wound rubber strip 20a now during the winding process, a contact pressure device is used in the production system according to the invention, by way of which the rubber strip 20a of the bandage is pressed on the belt 10 positioned on the drum. In the exemplary embodiment shown, the contact pressure device is a contact pressure roller 3. In FIG. 1, the rotation direction $A_A$ of the contact pressure roller 3 is also shown. The rotation axis $A_A$ of the contact pressure roller 3 and the rotation axis A of the rotatable drum are parallel. The contact pressure roller 3 exerts on the wound rubber strip 20a a specific pressure which is typically between 0.15 N/cm$^2$ and 0.4 N/cm$^2$. In particular, a pressure of 0.2 N/mm$^2$ to 0.3 N/mm$^2$ is often applied to the already wound rubber strip 20a by the contact pressure roller 3 for production. FIG. 3 shows a typical winding pattern of how a bandage is wound on the surface of the belt 10. The entire circumferential face of the belt 10 is shown here, in that this face has been produced in a developed view to form a two-dimensional face. Therefore, the horizontal shows the extent of the belt face in the axis direction A of the rotatable drum 1, and in the vertical direction shows the circumferential direction of the belt scaled in angles. Below this two-dimensional illustration is situated further a diagram that only illustrates the positioning of the belt 10 and the wound rubber strip 20a relative to the rotation axis of the rotatable drum 1. The exact position in the radial direction of the drum is not illustrated. It can be seen that the belt 10 consists of a first steel cord belt layer 11 and a second steel cord belt layer 12. Furthermore, it can be seen from the illustration of FIG. 3 that the winding of the rubber strip 20 extends in the axial direction beyond the axial ends of the belt 10. From this winding pattern it can be seen how the rubber strip 20 as a wound rubber strip 20a is to be disposed on the belt 10 so that the pneumatic vehicle tire later produced with this composite of belt 10 and bandage 20a is suitable as a UHP tire for very high speeds. By the method shown, a pneumatic vehicle tire according to the invention claimed with this application can be manufactured with a quality that has not been possible to date. The wound rubber strip shown in the exemplary embodiment has a width of 10 mm and has nine cords of nylon disposed next to one another in the width of the rubber strip, which have a diameter of 0.7 mm. The cords in the rubber strip 20 accordingly have a cord spacing of 1.111 mm. Typically, such rubber strips are manufactured in that the cords are provided with a rubber coating and then disposed so as to be parallel to one another. The cords are positioned in the rubber strip in such a way that two adjacent portions of the rubber strip in this instance also have a cord spacing between the neighboring cords of both portions, this corresponding to the cord spacing otherwise prevalent in the rubber strip 20. During the winding process in the winding system according to the invention, the feeding head 2 which, as shown in FIG. 1, is movable along an axis $A_Z$, parallel to the axis A of the rotatable drum, first moves to the one end of the belt in the axial direction, and first positions the rubber strip 20 on the belt 10, the latter being positioned on the rotatable drum 1. First, as a securing measure for the wound rubber strip 20a, the rubber strip 20 is wound over a circumference directly in the circumferential direction of the rotatable drum 1 and thus of the belt 10. For this winding, the rotatable drum 1 is set in motion by the drive 4. After this first revolution, in which the wound rubber strip 20a in the axis direction is situated in a position which protrudes beyond the axial end of the belt 10, the feeding head 2 is set in motion along the axis direction $A_Z$. As a result of this movement of the feeding head 2, the rubber strip 20 is then no longer wound directly in the circumferential direction of the rotatable drum, but in a winding direction slightly deviating therefrom. Here, the winding direction is selected such that with each revolution of the rotatable drum, the feeding head 2 in the axial direction of the belt 10, moves in the direction of the other end by the width of the rubber strip 2. In the exemplary embodiment, therefore, the feeding head 2 in one rotation of the rotatable drum 1 moves by 10 mm in the direction of the other end of the belt 10. As can be seen from FIG. 3 and the winding pattern shown there, as a result of this type of winding, a portion of the rubber strip is placed in each case exactly next to the portion of the rubber strip present after one revolution, so that there is ideally no gap and also no overlap between the neighboring portions of the rubber strip over the entire width $W_G$ of the belt 10 in the axis direction A. A permissible gap between adjacent portions of the wound rubber strip 20A is less than 0.05 mm, preferably less than 0.02 mm, and more preferably less than 0.01 mm. In particular, the winding of the rubber strip 20 by the guide head 2 is carried out in such a way that the movement of the guide head 2 relative to the rotatable drum 1 over the entire bandage width W is in such a manner that two cords, which are situated in two adjacent portions of the wound rubber strip 20a and neighbor one another due to the peripheral position in the rubber strip 20, have almost the same spacing as the cords in the rubber strip 20 per se. In this case, the spacing of these adjacent cords in the neighboring portions of the rubber strip 20a does not deviate by more than 5% from the usual spacing of the cords in the rubber strip 20. In order to achieve an accurate winding of this type of the wound rubber strip 20a and of the cords 24 contained in the latter, it is necessary to suppress any movement of the rubber strip 20a after winding of the latter. In order to ensure this, the production system according to the invention of a pneumatic vehicle tire, which carries out the winding process of the bandage, additionally comprises the contact pressure roller 3. This contact pressure roller 3, which rotates about this axis $A_A$ parallel to the rotation axis A of the rotatable drum 1, co-rotates during the rotation of the drum 1. In the process, said contact pressure roller 3 exerts on the already wound rubber strip 20a a specific pressure which is so high that slipping of the wound rubber strip 20a is no longer possible. The pressure exerted on the wound rubber strip 20a by the contact pressure roller 3, which typically consists of a polymer material, that is, a plastics material, is typically between 0.15 N/mm$^2$ to 1 N/mm$^2$. Preferably, pressures between 0.2 N/mm$^2$ and 0.3 N/mm$^2$ are in particular exerted by the drive roller 3. The guide head 2 moves along the axis $A_Z$ until reaching the other end of the belt 10. If the wound belt in the axial direction A has reached a position which extends beyond the axial end of the belt, then in the exemplary embodiment a final additional wrapping is performed with the rubber strip 20, so as to secure the wound rubber strip 20a. In this last winding, which takes place without further advancing of the guide head 2, an overlap of the already wound rubber strip 20a is accepted as a trade-off. As already mentioned, the use of the contact pressure roller 3 in the winding system, as is schematically illustrated in FIGS. 1 and 2, has the effect that there are neither large spacings between the wound portions of the wound rubber strip 20a, nor an overlap of the rubber strip portions and the cords 24 contained therein. Such an overlap can be seen in FIG. 4. FIG. 4 shows a section through a pneumatic vehicle tire manufactured according to the prior art. To be seen in the cross-sectional image is the belt, with the steel cords 14 thereof, contained in the pneumatic vehicle tire shown. This belt consists of a first steel cord belt layer 11 and a second steel cord belt layer 12. To be seen above in FIG. 4, i.e. in the radial direction outside thereof, is the bandage of the wound rubber strip 20a which is wound about the belt 10, more specifically to be seen in the image are the cords 24, 24' consisting of reinforcement fibers of the bandage, the latter consisting of one wound rubber strip, but may also consist of two wound rubber strips. It can be seen that the cords 24 and cords 24' overlap, i.e. are situated on top of one another in the radial direction. In this case, the neighboring portions, wound next to one another, of the wound rubber strip 20a have overlapped in the winding process. If two rubber strips have been wound about the belt as a bandage, the overlap of the rubber strips and thus of their cords 24, 24' during the winding process may either have been intended or have happened due to fluctuations in the winding process. In any case, in this instance there is at this point of overlap of the cords 24 and 24' a weak spot of the pneumatic vehicle tire, because due to the overlap there is an asymmetry of the tread 30 which is situated thereabove so as to be radially outward and has a profile shown. The overlap results in a radial increase in the height of the pneumatic vehicle tire in this region, which results in a reduced contact surface of the pneumatic vehicle tire on the road: This face is also called the contact surface of the tire. The reduction of the contact surface then leads to a poorer braking behavior of the pneumatic vehicle tire. Shown in FIG. 5, is now a pneumatic vehicle tire according to the invention; in the sectional image shown, the belt 10 with two steel cord belt layers 11 and 12 as well as the rubber strip 20 with its cords 24 made of reinforcement fibers can be seen again. In addition, the tread 30 of the pneumatic vehicle tire can be seen again. The tread 30 again has a profile. It can be clearly seen that the cords of the wound rubber strip 20a are disposed next to one another in the axis direction of the pneumatic vehicle tire and in the latter are very uniformly spaced. As a result of this very homogeneous structure of the cords 24, a pneumatic vehicle tire according to the invention has no major weak spots which have a very negative effect at high vehicle speeds, as described above. It can thus be seen that the production according to the invention by the claimed production method, which is carried out by means of the claimed production system, leads to a pneumatic vehicle tire, in particular a UHP pneumatic vehicle tire, the bandage of which has such a high-quality winding that the quality and safety of the pneumatic vehicle tire is significantly increased as a result. In the production method according to the invention, the winding of the rubber strip of the bandage takes place under a tensile force. This tensile force in most instances is at least 15 to 20 N. The tensile force is exerted on the rubber strips to be wound preferably by the feed device, the latter in the exemplary embodiment being the feeding head 2. In this, for example, a spring which acts on a pilot roller or another guide element exerts the force on the rubber strip 20 to be wound. In order to increase the stability of a pneumatic vehicle tire, however, the rubber strip 20 of the bandage can also be wound at higher tensile forces. Corresponding to the tensile force applied during winding, the cords of the bandage in the finished pneumatic vehicle tire according to the invention then have a tension to which they remain subjected. In particular, by expanding the completed bandage belt compound during the further manufacturing of the pneumatic vehicle tire in a vulcanizing press, the tension in the cords of the bandage is increased once more in comparison to the tensile force applied to the cords in the wound rubber strips 20a during the winding process. Shown in FIGS. 6 and 7 are two different tensile force distributions along the axis direction A of the rotatable drum 1, and thus also the axis direction A of a pneumatic vehicle tire completed therefrom, according to which the winding of the bandage can be performed at increased tensile forces. Each diagram shows how the tensile force varies over the width of the belt 10. Here, the center of the belt is at the value 0). In the exemplary embodiment shown in FIG. 6, the rubber strip 20 of the bandage is wound at a tensile force of 50 N over the entire width of the bandage W, which in this example is 300 mm or slightly less. Alternatively, it is also conceivable that the winding takes place at a tensile force of, for example, 75, 100 or 150 N. In contrast, shown in FIG. 7 is a tensile force distribution in which the tensile force is not constant over the entire width $W_G$ of the belt 10. Rather, in the peripheral regions of the belt 10, the width $W_G$ of the latter usually being slightly smaller than the width of the bandage W, is wound at a tensile force of 75 N in each case over a width of 50 mm in the axis direction A of the rubber strips 20 of the bandage. In the regions between these peripheral regions, the tensile force then decreases from 75 N to 15 N in the center of the belt 10. Winding of this type takes into account in particular that the shoulder region of a pneumatic vehicle tire in particular proves to be a weak spot, e.g. because the end of the belt of the pneumatic vehicle tire is situated there. The increased tensile force during winding, or the increased tension of the cords in the shoulder region in the manufactured pneumatic vehicle tire, then prevents radial growth of the pneumatic vehicle tire at high speeds, particularly in the shoulder region. Thus, the tensile force distribution shown in FIG. 7 can be used in particular in the manufacturing of UHP tires. As an alternative to the tensile force distribution shown in FIG. 7, higher tensile forces can also act on the rubber strip 20 during winding, particularly in the shoulder region. The tensile forces herein can be up to 150 N, and in particular up to 200 N. The quality and safety of vehicle tires can be increased by the production system according to the invention for pneumatic vehicle tires and the production method according to the invention made possible by this. In particular, it is possible for the first time with this system and the associated processes to manufacture the pneumatic vehicle tires according to the invention with their very high requirements.

LIST OF REFERENCE SIGNS

1 Rotatable drum
2 Feeding head
3 Contact pressure roller
4 Drive of the rotatable drum
10 Belt
11 First steel cord belt layer 12 Second steel cord belt layer
14 Steel cord of the belt
20 Rubber strip
20a Wound rubber strip
24, 24' Cords of the rubber strip
25 Further winding of the rubber strip
30 Tread of a pneumatic vehicle tire
A Axis direction of the drum and of the finished pneumatic vehicle tire
$A_A$ Axis direction of the contact pressure roller
$A_Z$ Axis direction of the guide head
W Bandage width
$W_G$ Belt width

The invention claimed is:

1. A system for producing a pneumatic vehicle tire having a belt including at least one steel cord belt layer, which encircles the tire circumference, and a bandage which externally bears radially on the belt over the entire tire circumference, the system comprising:
    a rotatable drum on which the belt is positioned,
    a feed device which feeds the bandage to the belt positioned on the rotatable drum, the feed device applying the bandage within a first region relative to the rotatable drum when said bandage is being wound about the belt by rotation of the drum, the bandage including a rubber strip in which at least one cord of reinforcement fibers is contained, and
    a contact pressure device which presses the bandage onto the belt positioned on the rotatable drum, the contact pressure device pressing the bandage within a second region relative to the rotatable drum when said bandage is being wound about the belt by the rotation of the drum, wherein the second region where the contact pressure device presses the bandage is spaced apart from the first region where the bandage is applied to the belt by the feed device,
    wherein the system is configured such that the feed device, in cooperation with the contact pressure device and rotatable drum, wind the rubber strip about the belt in a winding direction relative to the circumferential direction of the pneumatic vehicle tire from at least from one axial end of the belt up to at least an other axial end of the belt, the rubber strip during winding being pressed onto the outside of the belt by the contact pressure device, and the rubber strip being fed by the feeding device is wound by rotation of the rotatable drum,
    wherein a ratio of a winding direction component in the axis direction to a winding direction component in the circumferential direction along the rubber strip is less than 0.01, and does not vary by more than 2% over at least 85% of a width of the belt in the axis direction, and
    wherein a spacing of two neighboring cords in two adjacent portions of the rubber strip at each circumferential position does not vary by more than 5% in comparison to the spacing of the cords in the rubber strip, and the cords in the bandage are subjected to a tension of at least 3 $N/mm^2$ over at least 25% of the width of the belt in the axis direction.

2. The system according to claim 1, wherein, as a result of the rotation of the rotatable drum when winding the bandage about the belt, the rubber strip of the bandage is wound at a tensile force of 10 N to 200 N.

3. The system according to claim 1, wherein, the contact pressure device is a roller that presses the rubber strip of the bandage onto the belt with a pressure of 0.15 $N/mm^2$ to 1 $N/mm^2$.

4. The system according to claim 1, wherein, the contact pressure device is a roller that presses the rubber strip of the bandage onto the belt with a pressure of 0.15 $N/mm^2$ to 0.4 $N/mm^2$.

5. The system according to claim 1, wherein the second region where the contact pressure device presses the bandage onto the belt is at an opposite side of the drum compared to the first region where the bandage is applied to the belt by the feed device.

6. A method for producing a pneumatic vehicle tire, comprising:
    winding a bandage externally on a belt of the tire, in which the belt is positioned on a rotatable drum, wherein the belt includes at least one steel cord belt layer, which encircles the tire circumference, and the bandage includes a rubber strip containing at least one cord of reinforcement fibers,
    wherein the bandage is fed to the belt positioned on the rotatable drum by a feed device, wherein the feed device applies the bandage within a first region relative to the rotatable drum when said bandage is being wound about the belt by rotation of the drum; and
    the bandage during winding is pressed onto the outside of the belt by a contact pressure device, and the fed rubber strip is wound by the rotation of the rotatable drum, wherein the contact pressure device presses the bandage within a second region relative to the rotatable drum when said bandage is being wound about the belt by the rotation of the drum, wherein the second region where the contact pressure device presses the bandage is spaced apart from the first region where the bandage is applied to the belt by the feed device,
    wherein the axial position of the feeding head during winding moves uniformly from at least one axial end of the belt to an other axial end of the belt,
    wherein the rubber strip, as a result of a movement of the feed device along a movement axis parallel to the axis direction of the rotatable drum, is wound in a winding direction relative to the circumferential direction of the rotatable drum,
    wherein a ratio of a winding direction component in the axis direction to a winding direction component in the circumferential direction along the rubber strip is less than 0.01, and does not vary by more than 2% over at least 85% of a width of the belt in the axis direction, and
    wherein a spacing of two neighboring cords in two adjacent portions of the rubber strip at each circumferential position does not vary by more than 5% in comparison to the spacing of the cords in the rubber strip, and the cords in the bandage are subjected to a tension of at least 3 $N/mm^2$ over at least 25% of the width of the belt in the axis direction.

7. The method according to claim 6, wherein, as a result of the rotation of the rotatable drum when winding the bandage about the belt, the rubber strip of the bandage is wound at a tensile force of 10 N to 200 N.

8. The method according to claim 6, wherein, the contact pressure device is a roller that presses the rubber strip of the bandage onto the belt with a pressure of 0.15 $N/mm^2$ to 1 $N/mm^2$.

9. The method according to claim 6, wherein, the contact pressure device is a roller that presses the rubber strip of the bandage onto the belt with a pressure of 0.15 N/mm$^2$ to 0.4 N/mm$^2$.

10. The method according to claim 6, wherein the spacing of the two neighboring cords in the two adjacent portions of the rubber strip at each circumferential position does not vary by more than 2% in comparison to the spacing of the cords in the rubber strip.

11. The method according to claim 6, wherein the cords in the bandage are subjected to a tension of at least 3 N/mm$^2$ over at least 40% of the width of the belt in the axis direction.

12. The method according to claim 6, wherein the cords in the bandage are subjected to a tension of at least 3 N/mm$^2$ over at least 80% of the width of the belt in the axis direction.

13. The method according to claim 6, wherein the cords in the bandage are subjected to a tension of at least 12 N/mm$^2$ over at least 25% of the width of the belt in the axis direction.

14. The method according to claim 6, wherein the cords in the bandage are subjected to a tension of at least 30 N/mm$^2$ over at least 25% of the width of the belt in the axis direction.

15. The method according to claim 6, wherein the cords in the bandage are subjected to a tension of at least 80 N/mm$^2$ over at least 25% of the width of the belt in the axis direction.

16. The method according to claim 6, wherein the cords in the bandage are subjected to a tension of at least 12 N/mm$^2$ over at least 40% of the width of the belt in the axis direction.

17. The method according to claim 6, wherein the cords in the bandage are subjected to a tension of at least 12 N/mm$^2$ over at at least 60% of the width of the belt in the axis direction.

18. The method according to claim 6, wherein the cords in the bandage are subjected to a tension of at least 12 N/mm$^2$ over at at least 80% of the width of the belt in the axis direction.

19. The method according to claim 6, wherein in the at least 25% of the width of the belt in the axis direction, the tension to which the cords in the bandage are subjected fluctuates only by at most 5%.

20. The method according to claim 6, wherein the tension to which the cords in the bandage are subjected fluctuates only by at most 1%.

* * * * *